(12) United States Patent
Lee

(10) Patent No.: US 12,545,630 B2
(45) Date of Patent: Feb. 10, 2026

(54) ELECTROSTATIC CHUCK, ELECTROSTATIC CHUCK HEATER COMPRISING SAME, AND SEMICONDUCTOR HOLDING DEVICE

(71) Applicant: AMOSENSE CO.,LTD, Cheonan-si (KR)

(72) Inventor: Ji Hyung Lee, Cheonan-si (KR)

(73) Assignee: AMOSENSE CO., LTD., Cheonan-si (KR)

(*) Notice: Subject to any disclaimer, the term of this patent is extended or adjusted under 35 U.S.C. 154(b) by 147 days.

(21) Appl. No.: 18/562,171

(22) PCT Filed: May 23, 2022

(86) PCT No.: PCT/KR2022/007278
§ 371 (c)(1),
(2) Date: Nov. 17, 2023

(87) PCT Pub. No.: WO2022/250394
PCT Pub. Date: Dec. 1, 2022

(65) Prior Publication Data
US 2024/0239716 A1  Jul. 18, 2024

(30) Foreign Application Priority Data
May 24, 2021 (KR) .................. 10-2021-0066114

(51) Int. Cl.
C04B 41/50 (2006.01)
C04B 35/584 (2006.01)
(Continued)

(52) U.S. Cl.
CPC ........ C04B 41/5045 (2013.01); C04B 35/584 (2013.01); C04B 35/6261 (2013.01);
(Continued)

(58) Field of Classification Search
CPC .............. C04B 41/5045; C04B 35/584; H01L 21/6833
See application file for complete search history.

(56) References Cited

U.S. PATENT DOCUMENTS 10,629,466 B2    4/2020  Ito et al.
2004/0074586 A1*  4/2004  Hiramatsu ......... H01L 21/6831
                                                       279/128
(Continued)

FOREIGN PATENT DOCUMENTS

JP    H03-290370 A    12/1991
JP    2000243819 A     9/2000
(Continued)

OTHER PUBLICATIONS

International Search Report issued in PCT/KR2022/007278 on Aug. 31, 2022, 5 pgs.

*Primary Examiner* — Scott Bauer
(74) *Attorney, Agent, or Firm* — ROTHWELL, FIGG, ERNST & MANBECK, P.C.

(57) ABSTRACT

An electrostatic chuck is provided. Implemented according to an embodiment of the present invention is an electrostatic chuck comprising: a silicon nitride sintered body; a surface modification layer covering at least a portion of the external surface of the silicon nitride sintered body and having corrosion resistance and plasma resistance; and an electrostatic electrode laid inside the silicon nitride sintered body. Therefore, the electrostatic chuck includes a ceramic sintered body of silicon nitride, and thus has excellent plasma resistance, chemical resistance, and thermal shock resistance while exhibiting an equivalent or similar level of heat dissipation performance compared to ceramic sintered bodies of aluminum nitride that have been conventionally widely used, so that the electrostatic chuck can be widely used in semiconductor processes.

20 Claims, 2 Drawing Sheets

(51) Int. Cl.
*C04B 35/626* (2006.01)
*C04B 35/632* (2006.01)
*C04B 41/00* (2006.01)
*C04B 41/45* (2006.01)
*C04B 41/87* (2006.01)
*H01J 37/32* (2006.01)
*H01L 21/683* (2006.01)
*H05B 3/26* (2006.01)

(52) U.S. Cl.
CPC .... *C04B 35/62675* (2013.01); *C04B 35/6268* (2013.01); *C04B 35/632* (2013.01); *C04B 41/0036* (2013.01); *C04B 41/4529* (2013.01); *C04B 41/5031* (2013.01); *C04B 41/87* (2013.01); *H01J 37/32724* (2013.01); *H01L 21/6833* (2013.01); *H05B 3/265* (2013.01); *C04B 2235/3206* (2013.01); *C04B 2235/3225* (2013.01); *C04B 2235/3878* (2013.01); *C04B 2235/3882* (2013.01); *C04B 2235/428* (2013.01); *C04B 2235/5436* (2013.01); *C04B 2235/5445* (2013.01); *C04B 2235/6562* (2013.01); *C04B 2235/6584* (2013.01); *C04B 2235/9607* (2013.01); *C04B 2235/9669* (2013.01); *H01J 2237/2007* (2013.01)

(56) References Cited

U.S. PATENT DOCUMENTS

| | | | |
|---|---|---|---|
| 2007/0253139 | A1 | 11/2007 | Nakano et al. |
| 2015/0062772 | A1 | 3/2015 | Waite et al. |
| 2015/0243541 | A1* | 8/2015 | Hayashi .............. H01L 21/6875 427/126.3 |

FOREIGN PATENT DOCUMENTS

| | | | |
|---|---|---|---|
| JP | 2003282689 A | 10/2003 |
| JP | 2004-335151 A | 11/2004 |
| JP | 2007299837 A | 11/2007 |
| JP | 2013-157570 A | 8/2013 |
| JP | 2019-052072 A | 4/2019 |
| KR | 1019980031739 A | 7/1998 |
| KR | 10-2016-0111005 A | 9/2016 |
| KR | 10-1769608 B1 | 8/2017 |
| KR | 20170127417 A | 11/2017 |
| KR | 10-2017-0135105 A | 12/2017 |

* cited by examiner

[FIG. 1]
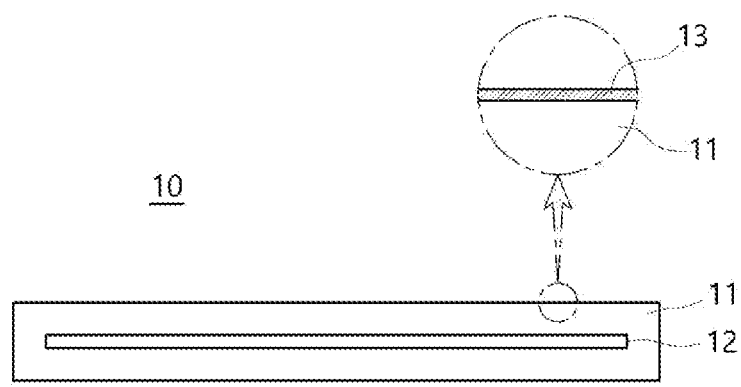

[FIG. 2]
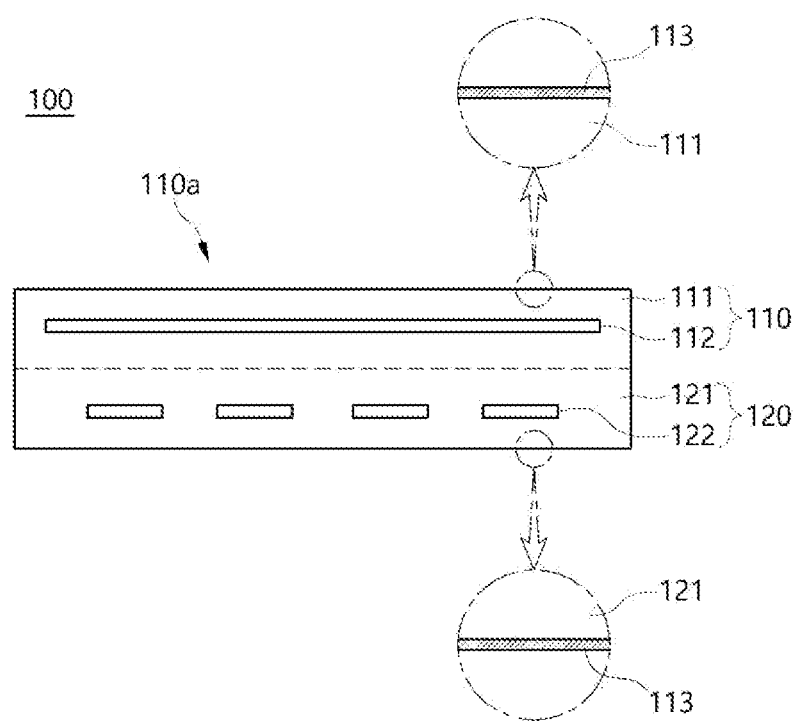

ELECTROSTATIC CHUCK, ELECTROSTATIC CHUCK HEATER COMPRISING SAME, AND SEMICONDUCTOR HOLDING DEVICE

CROSS REFERENCE TO RELATED APPLICATIONS

This application is a 35 U.S.C. 371 National Phase Entry Application from PCT/KR2022/007278 filed May 23, 2022, designating the United States, which claims priority to and the benefit of Korean Patent Application No. 10-2021-0066114, filed on May 24, 2021, the disclosures of which are incorporated herein by reference in their entirety.

TECHNICAL FIELD

The present invention relates to an electrostatic chuck, an electrostatic chuck heater including the same and a semiconductor holding device.

BACKGROUND ART

Electrostatic chucks are used to adsorb and hold semiconductor wafers in film manufacturing processes, such as transfer, exposure, chemical vapor deposition (CVD) and sputtering, and a series of steps, such as microfabrication, cleaning, etching and dicing. As substrates of such electrostatic chucks, research on dense ceramics is being actively conducted. Particularly, in the devices for manufacturing semiconductors, halogen corrosive gases, such as $ClF_3$, are often used as etching gases or cleaning gases. Additionally, in order to rapidly heat and cool a semiconductor wafer while holding the same in the chuck, it is required that the substrate of the electrostatic chuck has high thermal conductivity. Furthermore, such high thermal shock resistance that is not easily destroyed by such a rapid temperature change is also required. Moreover, as the plasma method is used for etching or deposition in semiconductor processes, the demand for substrates of electrostatic chucks having plasma resistance is increasing day by day.

However, aluminum nitride, which is widely used as a material for an electrostatic chuck substrate, has excellent heat dissipation characteristics, but it has a problem in that it is easily damaged by plasma in the etching or deposition process in which the plasma method is used during semiconductor processes, resulting in a deterioration in durability. In addition, there is a problem in that cracks are frequently generated due to thermal shock. Moreover, there is a problem in that durability reduction due to plasma or thermal shock shortens the replacement cycle of the electrostatic chuck.

DISCLOSURE

Technical Problem

The present invention has been devised in consideration of the above-described points, and an object of the present invention is to provide an electrostatic chuck that has excellent heat dissipation characteristics while also having chemical resistance to chemicals such as corrosive gases that are applied during the semiconductor process, plasma resistance to plasma processing and thermal shock resistance due to rapid temperature changes, an electrostatic chuck heater including the same and a semiconductor holding device.

Technical Solution

The present invention has been devised in consideration of the above-described points, and provides an electrostatic chuck, including a silicon nitride sintered body; a surface modification layer covering at least a portion of the external surface of the silicon nitride sintered body and having corrosion resistance and plasma resistance; and an electrostatic electrode laid inside the silicon nitride sintered body.

According to an exemplary embodiment of the present invention, the surface modification layer may include at least one selected from the group consisting of $SiO_2$, $Y_2O_3$, $Y_4Al_2O_9$ (YAM), $Al_2O_3$, $Y_3Al_5O_{12}$ (YAG), $YAlO_3$ (YAP), SiC, Sialon, AlN, AlON, $TiO_2$, $ZrO_2$, TiC, ZrC, TiN, TiCN and $Y_2O_3$-stabilized $ZrO_2$ (YSZ).

In addition, the silicon nitride sintered body may be formed by sintering a silicon nitride powder including 9 wt. % or less of polycrystalline silicon.

In addition, the silicon nitride sintered body may be formed by sintering a silicon nitride powder in which the weight ratio of an α crystalline phase is 0.7 or more in the total weight of an α crystalline phase and a β crystalline phase.

In addition, the silicon nitride sintered body may have a thermal conductivity of 70 W/mK or more and a 3-point bending strength of 650 MPa or more.

In addition, the silicon nitride sintered body may be prepared by sintering a silicon nitride powder, and the silicon nitride powder may be prepared by including the steps of preparing a mixed raw material powder including a metallic silicon powder and a crystalline phase control powder including a rare earth element-containing compound and a magnesium-containing compound; mixing the mixed raw material powder with an organic binder to produce granules with a predetermined particle size; nitrifying the granules at a predetermined temperature within the range of 1,200 to 1,500° C. while applying nitrogen gas at a predetermined pressure; and grinding the nitrified granules.

In addition, the metal silicon powder may be a dry-ground polycrystalline metal silicon scrap or single-crystal silicon wafer scrap in order to minimize contamination with metal impurities during grinding.

In addition, the metallic silicon powder may have an average particle diameter of 0.5 to 4 μm, the rare earth element-containing compound powder may have an average particle diameter of 0.1 to 1 μm, and the magnesium-containing compound powder may have an average particle diameter of 0.1 to 1 μm.

In addition, the granules may have a D50 value of 100 m or less, or more preferably, 20 to 55 μm.

In addition, the rare earth element-containing compound may be yttrium oxide, and the magnesium-containing compound may be magnesium oxide, and wherein the mixed raw material powder may include 2 to 5 mol % of yttrium oxide and 2 to 10 mol % of magnesium oxide.

In addition, during nitrifying treatment, the nitrogen gas may be applied at a pressure of 0.1 to 0.2 MPa.

In addition, during nitrifying treatment, heating may be performed at a temperature increase rate of 0.5 to 10° C./min from 1,000° C. or higher to a predetermined temperature.

In addition, the present invention provides an electrostatic chuck heater, which is an electrostatic chuck heater having a first surface on which a wafer is adsorbed and a second surface opposing thereto, the electrostatic chuck heating including an electrostatic chuck unit including a first ceramic sintered body, of which any one surface is the first surface, and an electrostatic electrode laid in the first ceramic sintered body; and a heater unit including a second ceramic sintered body, of which any one surface is the second surface, and at least one resistance heating element laid in the second ceramic sintered body, wherein at least any one of the first ceramic sintered body and the second ceramic sintered body is a silicon nitride sintered body which is provided with a plasma-resistant and corrosion-resistant surface modification layer on at least a portion of the outer surface.

According to an exemplary embodiment of the present invention, the first ceramic sintered body and the second ceramic sintered body may be simultaneously sintered and implemented as one body.

In addition, the present invention provides a semiconductor holding device, including the electrostatic chuck heater according to the present invention; and a cooling member disposed on a second surface side of the electrostatic chuck heater.

Advantageous Effects

Since the electrostatic chuck according to the present invention includes a ceramic sintered body of silicon nitride, it has excellent plasma resistance, chemical resistance and thermal shock resistance while exhibiting an equivalent or similar level of heat dissipation performance compared to ceramic sintered bodies of aluminum nitride that have been conventionally widely used, and thus, the electrostatic chuck can be widely used in semiconductor processes.

DESCRIPTION OF DRAWINGS

FIG. 1 is a mimetic cross-sectional view of an electrostatic chuck according to an exemplary embodiment of the present invention; and FIG. 2 is a mimetic cross-sectional view of an electrostatic chuck heater according to an exemplary embodiment of the present invention.

BEST MODE

Hereinafter, the exemplary embodiments of the present invention will be described in detail so that those skilled in the art can easily practice the present invention. The present invention may be embodied in many different forms and is not limited to the exemplary embodiments set forth herein.

Referring to FIG. 1, the electrostatic chuck 10 according to an exemplary embodiment of the present invention is implemented by including a silicon nitride sintered body 11, a surface modification layer 13 and an electrostatic electrode 12.

The electrostatic chuck 10 is a device that adsorbs and holds an object, for example, a semiconductor wafer by electrostatic attraction, and for example, it is used to fix a semiconductor wafer in the semiconductor manufacturing process. The electrostatic chuck 10 may have a support surface conforming to the shape of an object to be gripped, and for example, the electrostatic chuck 10 may have a disk shape to conform to the shape of a wafer. In addition, the size of the electrostatic chuck 10 may be the size of a typical electrostatic chuck used in semiconductor manufacturing, but the present invention is not limited thereto.

The silicon nitride sintered body 11 corresponds to the body of the electrostatic chuck 10, and serves to support the electrostatic electrode 12 laid therein and provide a support surface for adsorbing an object such as a semiconductor wafer. Since the silicon nitride sintered body 11 has excellent plasma resistance, chemical resistance and thermal shock resistance, as well as having excellent heat dissipation characteristics, it may be particularly useful for electrostatic chucks used in semiconductor processes.

According to an exemplary embodiment of the present invention, the silicon nitride sintered body 11 may be implemented through a silicon nitride powder which is prepared by the preparation method described below to express more improved characteristics in the above-described physical properties.

Specifically, the silicon nitride powder may be prepared by including the steps of preparing a mixed raw material powder including a metallic silicon powder and a crystalline phase control powder including a rare earth element-containing compound and a magnesium-containing compound; mixing the mixed raw material powder with an organic binder to produce granules with a predetermined particle size; nitrifying the granules at a predetermined temperature within the range of 1,200 to 1,500° C. while applying nitrogen gas at a predetermined pressure; and grinding the nitrified granules.

First of all, the step of preparing a raw material powder mixture including a metal silicon powder and a crystalline phase control powder including a rare earth element-containing compound and a magnesium-containing compound will be described.

As the raw material powder, the main metal silicon powder may be used without limitation in the case of a metal silicon powder which is capable of producing a silicon nitride powder through the direct nitrifying method. For example, the metal silicon powder may be a polycrystalline metal silicon scrap or a single crystal silicon wafer scrap. The polycrystalline metal silicon scrap may be a by-product of polycrystalline metal silicon used for semiconductor processing fixtures or solar panel manufacturing, and the single-crystal silicon wafer scrap may also be a by-product during silicon wafer manufacturing, and accordingly, these scraps, which are by-products, may be used as raw material powder such that the manufacturing cost can be lowered.

In addition, the polycrystalline metal silicon scrap or single crystal silicon wafer scrap may have a purity of 99% or more, and through this, it may be more advantageous to ensure thermal conductivity and mechanical strength of the sintered body when sintering the silicon nitride powder prepared therefrom.

In addition, the metal silicon powder may have a resistivity of 1 to 100 Ω·cm, and through this, it may be more advantageous in preparing a silicon nitride powder having desired physical properties of the present invention.

Meanwhile, the metal silicon powder used as the raw material powder may preferably be a polycrystalline metal silicon scrap or single crystal silicon wafer scrap that is ground into a predetermined size. In this case, in order to prevent contaminants such as metal impurities due to grinding from being mixed into the raw material powder, the grinding may use a dry grinding method, and specifically, it may be powdered by using a dry grinding method such as a disk mill, pin mill or jet mill. If contaminants are contained in the metal silicon powder, there is a concern of increasing manufacturing time and cost due to further washing processes such as acid washing to remove contaminants. In this case, the average particle diameter of the ground metal silicon powder may be 0.5 to 4 μm, and more preferably, 2 to 4 μm, and if the average particle diameter is less than 0.5 μm, it may be difficult to implement through the dry grinding method, and there is a concern that due to fine powder, the possibility of mixing of contaminants may increase, and densification may be difficult during sheet casting. In addition, if the average particle diameter of the metal silicon powder exceeds 4 μm, nitrification is not easy, and thus, there is a concern that non-nitrifying parts may exist, and densification of the final sintered body may be difficult.

Meanwhile, silicon nitride is difficult for self-diffusion and may be thermally decomposed at high temperatures, and thus, sintering is not easy due to limitations in sintering temperature, and it is difficult to implement a dense sintered body, and when a silicon nitride powder is prepared by using the direct nitrifying method, it may be difficult to control the crystalline phase. In order to solve these difficulties and improve the physical properties of a substrate on which the silicon nitride powder is sintered by removing impurities such as oxygen, a mixed raw material powder obtained by mixing a crystalline phase control powder with metal silicon powder is used as a raw material powder. For the crystalline phase control powder, for example, a rare earth element-containing compound, an alkaline earth metal oxide and a combination thereof may be used, and specifically, at least one selected from the group consisting of magnesium oxide (MgO), yttrium oxide ($Y_2O_3$), gadolinium oxide ($Gd_2O$), holmium oxide ($Ho_2O_3$), erbium oxide ($Er_2O_3$), ytterbium oxide ($Yb_2O_3$) and dysprosium oxide ($Dy_2O_3$) may be used. However, in the present invention, in order to more easily control the crystalline phase of the silicon nitride powder, magnesium oxide and yttrium oxide are necessarily contained in the crystalline phase control powder, and the magnesium oxide and yttrium oxide have the advantages of realizing a more dense, high-density sintered body when preparing a sintered body by using the prepared silicon nitride powder, and reducing the amount of residual grain boundary phases during sintering, thereby improving the thermal conductivity of the sintered body.

For example, the mixed raw material powder may include 2 to 5 mol % of the yttrium oxide and 2 to 10 mol % of the magnesium oxide. If the amount of yttrium oxide is less than 2 mol %, it may be difficult to realize a densified sintered body when sintering the implemented silicon nitride powder, and it is difficult to capture oxygen on the grain boundary, and as a result, as the amount of dissolved oxygen increases, the thermal conductivity of the sintered body may be low, and the mechanical strength may also decrease. In addition, if the amount of yttrium oxide exceeds 5 mol %, there is a concern that the thermal conductivity and fracture toughness of the sintered body obtained by sintering the implemented silicon nitride powder are reduced due to an increase of grain boundary phases. In addition, when if the amount of magnesium oxide is less than 2 mol %, both of thermal conductivity and mechanical strength of the sintered body obtained by sintering the implemented silicon nitride powder may be low, there is a risk of silicon elution during nitrifying, and it may be difficult to prepare a densified sintered body. In addition, if the amount of magnesium oxide exceeds 10 mol %, the residual amount of magnesium increases at the grain boundary during sintering, and as a result, the thermal conductivity of the implemented sintered body may be lowered, the sintering of the silicon nitride powder may not be easy, and the fracture toughness may be reduced.

In addition, the rare earth element-containing compound powder may have an average particle diameter of 0.1 to 1 μm, and the magnesium-containing compound powder may have an average particle diameter of 0.1 to 1 μm, and through this, it may be more advantageous to achieve the objects of the present invention.

Next, the step of mixing the mixed raw material powder with an organic binder to produce granules with a predetermined particle size is performed.

Instead of immediately nitrifying the mixed raw material powder, the granules are produced into granules having a predetermined particle size, and then, the granules are subjected to a nitrifying process, which will be described below. Through this, by increasing the mixing uniformity of the mixed raw material powder, the crystalline phase of the manufactured silicon nitride powder may be more easily controlled, and since it is possible to form a secondary phase of $Si_2Y_2O_5$, the thermal conductivity of the sintered body may be further improved, and it is possible to prepare a silicon nitride powder with uniform characteristics.

The granules may have a D50 value of 100 μm or less, more preferably, 20 to 100 μm, and even more preferably, 20 to 55 μm. If the D50 exceeds 100 μm, the inflow of nitrogen gas into the granules is not smooth such that nitrification does not occur completely, and silicon that has not been nitrified may be melted and eluted out of the graphite. In addition, when such a silicon nitride powder is prepared into a sintered body, there is a concern that the silicon eluted during the preparation of the silicon nitride powder may be eluted out again during the sintering process of the sintered body. Herein, the D50 value means a value on a 50% volume basis measured by using the laser diffraction scattering method.

Meanwhile, the granules may be obtained through dry spraying, and since it may be obtained by using known conditions and equipment that are capable of performing dry spraying, the present invention is not particularly limited thereto. In addition, the mixed raw material powder is implemented into a slurry mixed with an organic binder and then dry sprayed, and the organic binder may be used without limitation in the case of an organic binder that is used in slurry to implement a ceramic powder into granules. For example, it is preferable to use a polyvinyl butyral (PVB)-based binder as the organic binder. Meanwhile, during the production of granules, when the organic binder is contained in the production of granules but contained in a small amount, a separate degreasing process may not be performed prior to the nitrifying process described below. In this case, when mixing the organic binder with the mixed raw material powder, the solvent may be further mixed. The solvent may be used without limitation in the case of a solvent used in a slurry in order to implement a ceramic powder into granules. For example, the solvent preferably includes at least one selected from ethanol, methanol, isopropanol, distilled water and acetone.

Next, the step of nitrifying the obtained granules at a predetermined temperature within the range of 1,200 to 1,500° C. while applying nitrogen gas at a predetermined pressure is performed.

In this case, during nitrifying treatment, the nitrogen gas may be applied at a pressure of 0.1 to 0.2 MPa, and more preferably, at a pressure of 0.15 to 0.17 MPa. If the nitrogen gas pressure is less than 0.1 MPa, nitrification may not occur completely. In addition, if the nitrogen gas pressure exceeds 0.2 MPa, a phenomenon in which silicon is eluted during the nitrifying process occurs. In addition, during nitrifying treatment, heating may be performed at a temperature increase rate of 0.5 to 10° C./min from 1,000° C. or higher to a predetermined temperature, and if the temperature increase rate from 1,000° C. or higher to a predetermined temperature is less than 0.5° C./min, the sintering time may be excessively extended. In addition, if the temperature increase rate exceeds 10° C./min, silicon is eluted, and thus, it may be difficult to prepare a powder that is completely nitrified with silicon nitride.

In addition, the temperature during nitrifying treatment may be selected within the range of 1,200 to 1,500° C., and if the temperature during nitrifying treatment is less than 1,200° C., nitrification may not occur uniformly. In addition, since a β crystalline phase is quickly formed when the temperature exceeds 1,500° C. during nitrifying treatment, densification may be difficult when preparing a sintered body by using such a silicon nitride powder.

Next, the step of grinding the nitrified granules is performed.

As a step of preparing nitrified granules into a silicon nitride powder, it may be preferably performed by a dry method in order to prevent the incorporation of contaminants during grinding, and for example, it may be performed through an air jet mill.

The silicon nitride powder prepared by the above-described preparation method may include 9 wt. % or less of polycrystalline silicon derived from molten silicon, and such a silicon nitride powder may be suitable for preparing a sintered body having improved mechanical strength and thermal conductivity. Preferably, the silicon nitride powder may include polycrystalline silicon derived from molten silicon in an amount of 8 wt. % or less, more preferably, 6 wt. % or less, even more preferably, 4 wt. % or less, and still more preferably, 0 wt. %.

According to an exemplary embodiment of the present invention, the weight ratio of an α crystalline phase in the total weight of an α crystalline phase and a β crystalline phase may be 0.7 or more, and if the weight ratio of the α crystalline phase in the total weight of the α crystalline phase and the β crystalline phase is less than 0.7, it may be difficult to increase the densification of the sintered body which is sintered through the silicon nitride powder, and it is difficult to improve thermal conductivity and mechanical strength, and it may be particularly difficult to improve mechanical strength.

In addition, the silicon nitride powder may form a secondary phase of $Si_2Y_2O_5$ more uniformly on the grain boundary of the sintered body implemented therefrom, and through this, it is possible to express a synergistic effect in improving the thermal conductivity of the sintered body.

In addition, the silicon nitride powder may have an average particle diameter of 2 to 4 μm, and through this, it may be more advantageous to implement a sintered body having improved mechanical strength and thermal conductivity.

The above-described silicon nitride powder may be formed into a desired shape, for example, a disc-shaped molded body, and then subjected to a sintering process to be implemented as a silicon nitride sintered body 11. The molded body may be prepared by using a known sheet lamination method or press molding method.

When the method for preparing a molded body according to the sheet lamination method is described, it can be prepared by molding a slurry obtained by mixing the above-described silicon nitride powder with an organic binder into a sheet according to a known method such as the doctor blade method. Thereafter, a molded body may be prepared by laminating and thermally compressing several sheets of prepared ceramic green sheets and processing the same into a predetermined size.

In this case, as the solvent provided in the slurry, an organic solvent may be used to dissolve the organic binder and disperse the silicon nitride powder to adjust the viscosity, and as the organic solvent, a material that is capable of dissolving the organic binder may be used without limitation, and for example, terpineol, dihydro terpineol (DHT), dihydro terpineol acetate (DHTA), butyl carbitol Acetate (BCA), ethylene glycol, ethylene, isobutyl alcohol, methyl ethyl ketone, butyl carbitol, texanol (2,2,4-trimethyl-1,3-pentanediol monoisobutyrate), ethylbenzene, isopropylbenzene, cyclohexanone, cyclopentanone, dimethyl sulfoxide, diethyl phthalate, toluene and a mixture thereof may be used. In this case, it is preferable to mix 50 to 100 parts by weight of the solvent based on 100 parts by weight of the silicon nitride powder. If the content of the solvent is less than 50 parts by weight, the viscosity of the slurry is high, making it difficult to perform tape casting and difficult to control the coating thickness. If the content of the solvent exceeds 100 parts by weight, the viscosity of the slurry is too thin, and thus, it takes a long time to dry, and it may be difficult to control the thickness.

In addition, it is preferable to mix 5 to 20 parts by weight of the organic binder based on 100 parts by weight of the silicon nitride powder. The organic binder may be a cellulose derivative such as ethyl cellulose, methyl cellulose, nitrocellulose or carboxycellulose, or a polymer resin such as polyvinyl alcohol, acrylic acid ester, methacrylic acid ester or polyvinyl butyral, and when forming a molded body in the form of a sheet by the tape casting method is considered, polyvinyl butyral may be used as the organic binder.

Meanwhile, the slurry may further include a known material contained in the slurry for forming a sheet, such as a dispersant and a plasticizer, and the present invention is not particularly limited thereto.

Meanwhile, an electrode ink for forming an electrostatic electrode 12 may be treated on any one green sheet for preparing a molded body such that the electrostatic electrode 12 described below is laid inside the silicon nitride sintered body 11. The electrode ink may be a mixture of a conductive component, a solvent and a binder, but the present invention is not particularly limited thereto.

The implemented molded body may be sintered through a known method to form a silicon nitride sintered body 11, and during the sintering process, the electrode ink provided therein is also sintered to form the electrostatic electrode 12, and accordingly, it is possible to prepare an electrostatic chuck 10 to be finally obtained. Specifically, the molded body may be sintered at 0.5 to 1.0 MPa at a temperature of 1,800 to 1,900° C., and through this, it may be more advantageous to implement a high-quality silicon nitride sintered body. In addition, the silicon nitride sintered body 11 implemented therefrom may have a thermal conductivity of, for example, 70 W/mK or more, preferably, 80 W/mK or more, and even more preferably, 90 W/mK or more, and a 3-point bending strength of 650 MPa or more, preferably, 680 MPa or more, more preferably, 700 MPa or more.

At least a portion of the outer surface of the silicon nitride sintered body 11 described above includes a corrosion-resistant and plasma-resistant surface modification layer 13.

A silicon nitride ($Si_3N_4$) sintered body has excellent thermal shock resistance, but may be damaged in a plasma process performed on a wafer and an etching process using hydrofluoric acid or the like. Accordingly, the surface modification layer 13 may be included on at least a portion of the outer surface in order to supplement plasma resistance and corrosion resistance to plasma and etching solutions in the plasma process or etching process that is performed on a wafer.

The surface modification layer 13 may be a known layer having corrosion resistance and plasma resistance, and for example, it may be a layer including at least one selected from the group consisting of $SiO_2$, $Y_2O_3$, $Y_4Al_2O_9$ (YAM), $Al_2O_3$, $Y_3Al_5O_{12}$ (YAG), $YAlO_3$ (YAP), SiC, Sialon, AlN, AlON, $TiO_2$, $ZrO_2$, TiC, ZrC, TiN, TiCN and $Y_2O_3$-stabilized $ZrO_2$ (YSZ). Preferably, the surface modification layer 13 including $Y_2O_3$ may be more advantageous in terms of maximizing corrosion resistance and plasma resistance when it is used in combination with the silicon nitride sintered body 11.

The surface modification layer 13 may be formed by a material forming a surface modification layer on the silicon nitride sintered body 11 by using a known method such as a plasma spray process, a sol-gel process, an aerosol spray process or a physical vapor deposition (PVD) process, and preferably, it may be formed through electron beam (E-Beam) or aerosol deposition. Alternatively, some surface modification layers such as $SiO_2$ may be formed by moving a component used to prepare the silicon nitride sintered body toward the outer surface in the process of sintering the silicon nitride sintered body to form a separate layer or by being oxidized.

In addition, the surface modification layer 13 may have a thickness of 100 μm or more, and preferably, 100 to 300 μm. If the thickness of the surface modification layer is less than 100 μm, plasma resistance may be deteriorated by reacting with the crystalline phase control powder and being crystallized.

Next, the electrostatic electrode 12 laid inside the silicon nitride sintered body 11 described above will be described.

The electrostatic electrode 12 plays a role of holding a semiconductor wafer on the silicon nitride sintered body 11 by generating an electrostatic force between an object to be adsorbed, for example, a semiconductor wafer and the silicon nitride sintered body 11. The electrostatic force may be of the Coulomb or Johnson-Rabek type.

The electrostatic electrode 12 may be a material of an electrostatic electrode provided in a typical electrostatic chuck, and may be formed of, for example, a conductive component such as tungsten or molybdenum. In addition, the electrostatic electrode 12 may be provided as a single surface electrode or as a pair of internal electrodes, but the present invention is not limited thereto, and it may be laid in the silicon nitride sintered body 11 at the number, shape and size of electrostatic electrodes provided in a conventional electrostatic chuck.

The present invention includes an electrostatic chuck heater implemented by using the above-described electrostatic chuck. Referring to FIG. 2, the electrostatic chuck heater 100 is implemented by including an electrostatic chuck unit 110 that adsorbs and fixes an object to be adsorbed using an electrostatic force, and a heater unit 120 having a function of generating heat to be supplied to the object to be adsorbed. In addition, the electrostatic chuck heater 100 has a first surface on which an object to be attracted, for example, a semiconductor wafer, is absorbed and a second surface opposing thereto, and the first surface becomes any one surface of the electrostatic chuck unit 110, and the electrostatic chuck unit 110 and the heater unit 120 are positioned such that the second surface becomes any one surface of the heater unit 120.

The electrostatic chuck unit 110 includes a first ceramic sintered body 111, a plasma-resistant and corrosion-resistant surface modification layer 113 which is formed on at least a portion of the outer surface of the first ceramic sintered body 111, and an electrostatic electrode 112 which is laid inside the first ceramic sintered body 111, and the heater unit 120 includes a second ceramic sintered body 121, a plasma-resistant and corrosion-resistant surface modification layer 113 which is formed on at least a portion of the outer surface of the second ceramic sintered body 121, and at least one resistance heating element 122 which is laid inside the second ceramic sintered body 121. In this case, at least any one of the first ceramic sintered body 111 and the second ceramics sintered body 121 is provided as a silicon nitride sintered body, and it preferably may be the silicon nitride sintered body 11 of the electrostatic chuck 10 described above.

In addition, preferably, both of the first ceramic sintered body 111 and the second ceramics sintered body 121 may be silicon nitride sintered bodies. Accordingly, the silicon nitride sintered body has a plasma-resistant and corrosion-resistant surface modification layer 113 on at least a portion of the outer surface. However, although FIG. 2 illustrates that the surface modification layer 113 is provided on the outer surfaces of the first ceramic sintered body 111 and the second ceramics sintered body 121, the present invention is not limited thereto, and the surface modification layer 113 may not be provided on any one sintered body of the first ceramic sintered body 111 and the second ceramic sintered body 121.

Meanwhile, when only any one of the first ceramic sintered body 111 and the second ceramics sintered body 121 is a silicon nitride sintered body, the other may be a ceramic sintered body that is employed in a conventional electrostatic chuck heater, and the present invention is not particularly limited thereto.

In addition, the first ceramic sintered body 111 and the second ceramics sintered body 121 may be sintered together to form a single body. That is, the first ceramic sintered body 111 and the second ceramics sintered body 121 may be prepared into molded bodies by preparing a ceramic component into green sheets and then laminating the same as described in the preparation method of the silicon nitride sintered body 11 described above. In this case, while the green sheets to become the first ceramic sintered body 111 and the green sheets to become the second ceramic sintered body 121 are laminated to form a single molded body, a single molded body may be prepared, and by sintering the same simultaneously, it is possible to implement a ceramic sintered body that is integrated into one body. However, the present invention is not limited thereto, and it is noted that the first ceramic sintered body 111 and the second ceramic sintered body 121 may be independently prepared and then attached by using a known bonding method so as to be integrated.

Meanwhile, a separate intermediate layer (not illustrated) having a composition different from those of the first ceramic sintered body 111 and the second ceramic sintered body 121 may be further included between the first ceramic sintered body 111 and the second ceramic sintered body 121, and through this, it is possible to prevent the leakage of current transmitted from any one side of the electrostatic electrode 112 and the resistive heating element 122 to the other side. Alternatively, when the first ceramic sintered body 111 and the second ceramic sintered body 121 have different compositions, it is possible to prevent the diffusion of a certain component from any one sintered body to the other sintered body.

In addition, the electrostatic chuck unit 110 includes an electrostatic electrode 112, and the electrostatic electrode 112 may be made of an electrostatic electrode material that is provided in a conventional electrostatic chuck, and it may be, for example, molybdenum or tungsten.

In addition, the heater unit 120 includes a resistance heating element 122 inside the second ceramic sintered body 121, and for the resistance heating element 122, those that can be used as a heating element in a typical electrostatic chuck heater may be employed without limitation, and for example, it may be formed of a conductive material such as tungsten or molybdenum. In this case, as illustrated in FIG. 2, several resistance heating elements 122 may be laid inside the second ceramic sintered body 121, or one resistance heating element may be provided by being implemented in various shapes such as a spiral shape. Meanwhile, as a specific pattern in which the resistance heating element 122 is laid, the pattern of a resistance heating element in a conventional electrostatic chuck heater may be employed without limitation, and thus, the present invention is not particularly limited thereto.

In addition, the present invention includes a semiconductor holding device including the electrostatic chuck heater 100 according to the present invention described above and a cooling member which is disposed on a second surface side of the electrostatic chuck heater 100.

The cooling member is for controlling the temperature of the semiconductor wafer that is held on the electrostatic chuck heater 100, and it may serve to cool the semiconductor wafer heated through the heater unit 120. The cooling member may be used without limitation in the case of a cooling member commonly employed in a semiconductor holding device. For example, the cooling member may include a cooling substrate made of aluminum or titanium, in which a passage through which a refrigerant may flow is formed inside the cooling substrate.

In addition, the semiconductor holding device may employ known constitutions that are employed in semiconductor holding devices in addition to the electrostatic chuck heater 100 and the cooling member, for example, known constitutions, such as a power source that is capable of applying current to the electrostatic electrode 112 and the resistance heating element 122 of the electrostatic chuck heater 100, a focus ring placement table that is equipped with an electrostatic chuck for the focus ring, and a mounting plate supporting the same, without limitation, and the present invention is not particularly limited thereto.

Modes of the Invention

The present invention will be described in more detail through the following examples, but the following examples are not intended to limit the scope of the present invention, which should be interpreted to aid understanding of the present invention.

Preparation Example 1

A polycrystalline silicon scrap (purity of 99.99%, resistivity of 1 Ωcm) derived from a jig for semiconductor processing was dry-ground by using a jet mill to prepare a metallic silicon powder having an average particle diameter of 4 µm. Herein, 2 mol % of yttrium oxide having an average particle diameter of 0.5 µm and 5 mol % of magnesium oxide having an average particle diameter of 0.5 µm were mixed to prepare a mixed raw material powder. 100 parts by weight of the prepared mixed raw material powder was mixed with 80 parts by weight of ethanol as a solvent and 10 parts by weight of polyvinyl butyral as an organic binder to prepare a slurry for producing granules, and these were spray-dried by using a thermal spray device to produce granules having a D50 value of 20 µm. The produced granules were heat-treated at a nitrogen gas pressure of 0.15 MPa, and specifically, the temperature increase rate was set to 5° C./min until 1,000° C. and 0.5° C./min from 1,000° C. to 1,400° C., followed by heat treatment at 1,400° C. for 2 hours to obtain nitrified granules, and these were ground through an air jet mill to obtain a silicon nitride powder having an average particle diameter of 2 µm as shown in Table 1 below.

Afterwards, 5 parts by weight of polyvinyl butyral resin and 50 parts by weight of a solvent in which toluene and ethanol were mixed at a ratio of 5:5 were mixed, dissolved and dispersed in a ball mill based on 100 parts by weight of the obtained silicon nitride powder. Thereafter, the prepared slurry was prepared into a sheet shape having a final thickness of 170 µm through a conventional tape casting method, and then, the prepared 4 sheets were cross-laminated and sintered at 1,900° C. for 4 hours to prepare a silicon nitride substrate as shown in Table 1 below.

Preparation Examples 2 to 9

These were prepared in the same manner as in Preparation Example 1, except that a silicon nitride powder was obtained by changing the content of the ingredients in the raw material powder, the D50 value of the granules, the nitrifying conditions and the like as shown in Table 1 or Table 2 below, and through this, the silicon nitride powders and silicon nitride substrates as shown in Table 1 or Table 2 below were prepared.

Experimental Example 1

The following physical properties were evaluated for the silicon nitride powders or the silicon nitride substrates prepared in the preparation examples, and the results are shown in Table 1 or Table 2 below.
1. Crystalline Phase
For the silicon nitride powder, the α and β crystalline phases were quantified through XRD measurement, and the weight ratio of the α crystalline phase was calculated through the following formula.

$$\text{Weight ratio of } \alpha \text{ crystalline phase} = \alpha/(\alpha + \beta)$$

2. D50
The 50% volume reference value measured by using the laser diffraction scattering method was taken as the D50 value.
3. Sintered Density
The sintered density of the prepared substrate was measured by the Archimedes method.
4. Thermal Conductivity
The thermal conductivity of the prepared substrate was measured by the KS L 1604 (ISO 18755, ASTM E1461) method.
5. 3-Point Bending Strength
For the prepared substrate, the 3-point bending strength (S) was measured by the KS L 1590 (ISO 14704) method and calculated by the following formula.

$$S = (3PL)/(2bd^2) \qquad \text{[Formula]}$$

In the formula, P is the breaking load, L is the distance between points, b is the width of the beam, and d is the thickness of the beam.

a heater unit. Thereafter, an electrostatic chuck heater as shown in FIG. 2 was manufactured by forming a corrosion-resistant and plasma-resistant surface modification layer of

TABLE 1

| Classification | | Preparation Example 1 | Preparation Example 2 | Preparation Example 3 | Preparation Example 4 | Preparation Example 5 | Preparation Example 6 |
|---|---|---|---|---|---|---|---|
| Mixed Raw Material Powder | MgO (mol %) | 5 | 5 | 5 | 5 | 5 | 5 |
| | $Y_2O_3$ (mol %) | 2 | 2 | 2 | 2 | 2 | 2 |
| | Granule D50 (μm) | 20 | 30 | 40 | 60 | 80 | 100 |
| Nitrifying Conditions | Nitrogen Gas Pressure (MPa) | 0.15 | 0.15 | 0.15 | 0.15 | 0.15 | 0.15 |
| | Temperature Increase Rate from 1,000° C. to Nitrifying Temperature (° C./min) | 0.5 | 0.5 | 0.5 | 0.5 | 0.5 | 0.5 |
| | Nitrifying Temperature (° C.) | 1400 | 1400 | 1400 | 1400 | 1400 | 1400 |
| Silicon Nitride Powder | Weight Ratio of a Crystalline Phase [α/(α + β)] | 0.97 | 0.92 | 0.87 | 0.85 | 0.78 | 0.70 |
| | Eluted Si (wt. %) | 0 | 0 | 0 | 4 | 8 | 9 |
| Silicon Nitride Substrate | Sintered Density (g/cm³) | 3.21 | 3.20 | 3.17 | 3.01 | 2.92 | 2.94 |
| | Thermal Conductivity (W/mK) | 94 | 82 | 77 | 62 | 58 | 53 |
| | 3-Point Bending Strength (MPa) | 680 | 750 | 650 | 460 | 420 | 380 |

TABLE 2

| Classification | | Preparation Example 7 | Preparation Example 8 | Preparation Example 9 |
|---|---|---|---|---|
| Mixed Raw Material Powder | MgO (mol %) | 7 | 10 | 15 |
| | $Y_2O_3$ (mol%) | 2 | 2 | 2 |
| | Granule D50 (μm) | 32 | 32 | 32 |
| Nitrifying Conditions | Nitrogen Gas Pressure (MPa) | 0.15 | 0.15 | 0.15 |
| | Temperature Increase Rate from 1,000° C. to Nitrifying Temperature (° C./min) | 0.5 | 0.5 | 0.5 |
| | Nitrifying Temperature (° C.) | 1400 | 1400 | 1400 |
| Silicon Nitride Powder | Weight Ratio of α Crystalline Phase [α/(α + β)] | 0.79 | 0.92 | 0.95 |
| | Eluted Si (wt. %) | 0 | 0 | 0 |
| Silicon Nitride Substrate | Sintered Density (g/cm³) | 3.21 | 3.21 | 3.20 |
| | Thermal Conductivity (W/mK) | 121 | 87 | 82 |
| | 3-Point Bending Strength (MPa) | 750 | 720 | 680 |

As can be confirmed through Tables 1 and 2, it can be confirmed that the preparation examples are powders that are very suitable for improving the thermal conductivity and 3-point bending strength of a substrate that is prepared by using silicon nitride powder obtained by preparing a mixed raw material powder into granules having an appropriate size and then nitrifying the same. However, it can be seen that when the size of the granules was large as in Preparation Example 6, the content of silicon eluted from the silicon nitride powder may be high, and in this case, it may be insufficient to improve the mechanical strength and thermal conductivity of the prepared substrate.

Example 1

The 4 sheets prepared in Preparation Example 1 were cross-laminated, but after embedding a molybdenum electrostatic electrode between the upper two sheets and embedding a tungsten resistance heating element between the lower two sheets, it was sintered for 4 hours at 1,900° C. to prepare a laminate including an electrostatic chuck unit and a heater unit. Thereafter, an electrostatic chuck heater as shown in FIG. 2 was manufactured by forming a corrosion-resistant and plasma-resistant surface modification layer of $Y_2O_3$ with a thickness of 150 μm on the surface of the laminate by using the electron beam (E-beam) method.

Examples 2 to 4 and Comparative Example 1

Electrostatic chuck heaters as shown in Table 4 were manufactured in the same manner as in Example 1, except that the thickness, forming material, forming method, and the formation of the surface modification layer were changed.

Experimental Example 2

1. Plasma Resistance Measurement

For the electrostatic chuck heaters manufactured according to the examples and comparative examples, plasma resistance was measured under the conditions shown in Table 3 below. In this case, the etching depth and etching rate of a Si-Wafer were measured as a control group, and the etching depth and etching rate of the electrostatic chuck heaters manufactured according to the examples and comparative examples were measured, and based on the Si- Wafer etching rate of 1, the relative etching rates for the examples and comparative examples were measured.

Name of measuring equipment: NIE 150
Basic operating mechanism of measuring equipment: Inductively Coupled Plasma
Plasma exposure time: 60 minutes (Etching for 5 minutes, Delay for 5 minutes/12 Steps)

TABLE 3

| Plasma Power | | Gas (sccm) | | | |
| --- | --- | --- | --- | --- | --- |
| Plasma Power | Bias Power | CF$_4$ | O$_2$ | Ar | Pressure |
| 600 W | 150 W | 30 | 5 | 10 | 10 mTorr |

TABLE 4

| Classification | | Control Group | Example 1 | Example 2 | Example 3 | Example 4 | Comparative Example 1 |
| --- | --- | --- | --- | --- | --- | --- | --- |
| Surface Modification Layer | Thickness (μm) | — | 150 | 150 | 50 | 150 | Not formed |
| | Forming Method | — | Electron beam | Aerosol deposition | Electron beam | Electron beam | Not formed |
| | Forming Material | — | Y$_2$O$_3$ | Y$_2$O$_3$ | Y$_2$O$_3$ | Al$_2$O$_3$ | Not formed |
| Plasma Resistance | Etching Depth (μm) | 15.99 | 0.57 | 0.54 | 2.87 | 3.52 | 14.99 |
| | Etching Rate (nm/min) | 266.46 | 8.46 | 8.93 | 47.88 | 58.71 | 249.84 |
| | Relative Etching Rate | 1 | 0.03 | 0.03 | 0.18 | 0.22 | 0.94 |

As can be confirmed from Table 4, it can be seen that the plasma resistance is remarkably excellent when the thickness, forming material, forming method and formation of the surface modification layer according to the present invention are satisfied.

Although one exemplary embodiment of the present invention has been described above, the spirit of the present invention is not limited to the exemplary embodiments presented herein, and those skilled in the art who understand the spirit of the present invention may easily suggest other exemplary embodiments by changing, modifying, deleting or adding components within the scope of the same spirit, but this will also fall within the scope of the present invention.

The invention claimed is:

1. An electrostatic chuck, comprising:
a silicon nitride (Si$_3$N$_4$) sintered body;
a surface modification layer covering at least a portion of the external surface of the silicon nitride sintered body and having corrosion resistance and plasma resistance; and
an electrostatic electrode laid inside the silicon nitride sintered body,
wherein the silicon nitride sintered body is formed by sintering a silicon nitride powder comprising 9 wt. % or less of polycrystalline silicon.

2. The electrostatic chuck of claim 1, wherein the surface modification layer comprises at least one selected from the group consisting of SiO$_2$, Y$_2$O$_3$, Y$_4$Al$_2$O$_9$ (YAM), Al$_2$O$_3$, Y$_3$Al$_5$O$_{12}$ (YAG), YAlO$_3$ (YAP), SiC, Sialon, AlN, AlON, TiO$_2$, ZrO$_2$, TiC, ZrC, TiN, TiCN and Y$_2$O$_3$-stabilized ZrO$_2$ (YSZ).

3. The electrostatic chuck of claim 1, wherein the silicon nitride sintered body is formed by sintering a silicon nitride powder in which the weight ratio of an α crystalline phase is 0.7 or more in the total weight of an α crystalline phase and a β crystalline phase.

4. The electrostatic chuck of claim 1, wherein the silicon nitride sintered body has a thermal conductivity of 70 W/mK or more and a 3-point bending strength of 650 MPa or more.

5. The electrostatic chuck of claim 1, wherein the surface modification layer has a thickness of 100 μm or more.

6. The electrostatic chuck of claim 1, wherein the silicon nitride powder is produced by a method comprising:
preparing a mixed raw material powder comprising a metallic silicon powder and a crystalline phase control powder comprising a rare earth element-containing compound and a magnesium-containing compound;
mixing the mixed raw material powder with an organic binder to produce granules with a predetermined particle size;
nitrifying the granules at a predetermined temperature within the range of 1,200 to 1,500° C. while applying nitrogen gas at a predetermined pressure; and
grinding the nitrified granules.

7. The electrostatic chuck of claim 6, wherein the metallic silicon powder has an average particle diameter of 0.5 to 4 μm, the rare earth element-containing compound powder has an average particle diameter of 0.1 to 1 μm, and the magnesium-containing compound powder has an average particle diameter of 0.1 to 1 μm.

8. The electrostatic chuck of claim 6, wherein the granules have a D50 value of 20 to 55 μm or less.

9. An electrostatic chuck, comprising:
a silicon nitride (Si$_3$N$_4$) sintered body;
a surface modification layer covering at least a portion of the external surface of the silicon nitride sintered body and having corrosion resistance and plasma resistance; and
an electrostatic electrode laid inside the silicon nitride sintered body,
wherein the silicon nitride sintered body is prepared by sintering a silicon nitride powder, and the silicon nitride powder is prepared by comprising the steps of:
preparing a mixed raw material powder comprising a metallic silicon powder and a crystalline phase control powder comprising a rare earth element-containing compound and a magnesium-containing compound;
mixing the mixed raw material powder with an organic binder to produce granules with a predetermined particle size;
nitrifying the granules at a predetermined temperature within the range of 1,200 to 1,500° C. while applying nitrogen gas at a predetermined pressure; and
grinding the nitrified granules.

10. The electrostatic chuck of claim 9, wherein the metal silicon powder is a dry-ground polycrystalline metal silicon scrap or single-crystal silicon wafer scrap in order to minimize contamination with metal impurities during grinding.

11. The electrostatic chuck of claim 9, wherein the metallic silicon powder has an average particle diameter of 0.5 to 4 μm, the rare earth element-containing compound powder has an average particle diameter of 0.1 to 1 μm, and the magnesium-containing compound powder has an average particle diameter of 0.1 to 1 μm.

12. The electrostatic chuck of claim 9, wherein the granules have a D50 value of 20 to 55 μm or less.

13. The electrostatic chuck of claim 9, wherein the rare earth element-containing compound is yttrium oxide, and the magnesium-containing compound is magnesium oxide, and wherein the mixed raw material powder comprises 2 to 5 mol % of yttrium oxide and 2 to 10 mol % of magnesium oxide.

14. The electrostatic chuck of claim 9, wherein during nitrifying treatment, the nitrogen gas is applied at a pressure of 0.1 to 0.2 MPa.

15. The electrostatic chuck of claim 9, wherein during nitrifying treatment, heating is performed at a temperature increase rate of 0.5 to 10° C./min from 1,000° C. or higher to a predetermined temperature.

16. An electrostatic chuck, comprising:
a silicon nitride ($Si_3N_4$) sintered body;
a surface modification layer covering at least a portion of the external surface of the silicon nitride sintered body and having corrosion resistance and plasma resistance; and
an electrostatic electrode laid inside the silicon nitride sintered body,
wherein the silicon nitride sintered body is formed by sintering a silicon nitride powder in which the weight ratio of an α crystalline phase is 0.7 or more in the total weight of an α crystalline phase and a β crystalline phase.

17. The electrostatic chuck of claim 16, wherein the surface modification layer comprises at least one selected from the group consisting of $SiO_2$, $Y_2O_3$, $Y_4Al_2O_9$ (YAM), $Al_2O_3$, $Y_3Al_5O_{12}$ (YAG), $YAlO_3$ (YAP), SiC, Sialon, AlN, AlON, $TiO_2$, $ZrO_2$, TiC, ZrC, TiN, TiCN and $Y_2O_3$-stabilized $ZrO_2$ (YSZ).

18. The electrostatic chuck of claim 16, wherein the silicon nitride sintered body is formed by sintering a silicon nitride powder comprising 9 wt. % or less of polycrystalline silicon.

19. The electrostatic chuck of claim 16, wherein the silicon nitride sintered body has a thermal conductivity of 70 W/mK or more and a 3-point bending strength of 650 MPa or more.

20. The electrostatic chuck of claim 16, wherein the surface modification layer has a thickness of 100 μm or more.

* * * * *